United States Patent
Lee et al.

(10) Patent No.: US 12,438,235 B2
(45) Date of Patent: Oct. 7, 2025

(54) SEPARATOR AND LITHIUM BATTERY INCLUDING THE SAME

(71) Applicant: Samsung SDI Co., Ltd., Yongin-si (KR)

(72) Inventors: Jungyoon Lee, Yongin-si (KR); Hyeonsun Choi, Yongin-si (KR); Yangseob Kim, Yongin-si (KR); Jinyoung Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 580 days.

(21) Appl. No.: 17/226,999

(22) Filed: Apr. 9, 2021

(65) Prior Publication Data
US 2021/0320378 A1 Oct. 14, 2021

(30) Foreign Application Priority Data
Apr. 13, 2020 (KR) .................. 10-2020-0044788

(51) Int. Cl.
*H01M 50/446* (2021.01)
*H01M 10/0525* (2010.01)
(Continued)

(52) U.S. Cl.
CPC ..... *H01M 50/446* (2021.01); *H01M 10/0525* (2013.01); *H01M 10/0587* (2013.01);
(Continued)

(58) Field of Classification Search
CPC ............ H01M 50/446; H01M 50/414; H01M 50/449; H01M 50/431; H01M 10/0525; H01M 10/0587; H01M 2220/20
See application file for complete search history.

(56) References Cited

U.S. PATENT DOCUMENTS 8,986,892 B2   3/2015   Yoon et al.
9,368,778 B2   6/2016   Honda et al.
(Continued)

FOREIGN PATENT DOCUMENTS

CN   103247770 A   8/2013
CN   104051689 A   9/2014
(Continued)

OTHER PUBLICATIONS

"Polyacrylamide: 9003-05-8." ChemicalBook, https://www.chemicalbook.com/ChemicalProductProperty_EN_CB7390058.htm. https://www.chemicalbook.com/Chemical ProductProperty_EN_CB7390058.htm (Year: 2022).*
(Continued)

*Primary Examiner* — Niki Bakhtiari
(74) *Attorney, Agent, or Firm* — Knobbe, Martens, Olson & Bear, LLP

(57) ABSTRACT

This application relates to a separator and a lithium battery employing the same. In one aspect, the separator includes a porous substrate and a coating layer disposed on a surface of the porous substrate. The coating layer includes organic particles, a first binder, and inorganic particles. The organic particles have a first melting point of about 100° C. to about 130° C. The first binder has a second melting point higher than the first melting point by about 30° C. or more. The organic particles are coated by or embedded in the first binder. The separator can maintain a network structure even at a high temperature, making it possible to improve the high-temperature stability of a lithium battery by employing the separator, as well as delaying a rapid increase in temperature and heat generation when a shutdown occurs.

13 Claims, 6 Drawing Sheets

(51) Int. Cl.
*H01M 10/0587* (2010.01)
*H01M 50/414* (2021.01)
*H01M 50/431* (2021.01)
*H01M 50/449* (2021.01)

(52) U.S. Cl.
CPC ....... *H01M 50/414* (2021.01); *H01M 50/431* (2021.01); *H01M 50/449* (2021.01); *H01M 2220/20* (2013.01)

(56) References Cited

U.S. PATENT DOCUMENTS

| | | | |
|---|---|---|---|
| 9,431,643 | B2 | 8/2016 | Lai et al. |
| 9,461,290 | B2 | 10/2016 | Yamada et al. |
| 9,812,688 | B2 | 11/2017 | Park et al. |
| 9,887,406 | B2 | 2/2018 | Honda et al. |
| 9,905,824 | B2 | 2/2018 | Ryu et al. |
| 10,529,972 | B2 | 1/2020 | Seok et al. |
| 10,756,322 | B2 | 8/2020 | Kim et al. |
| 10,777,796 | B2 | 9/2020 | Kai et al. |
| 10,777,801 | B2 | 9/2020 | Shin et al. |
| 10,826,041 | B2 | 11/2020 | Lee et al. |
| 10,991,926 | B2 | 4/2021 | Kwon et al. |
| 11,264,674 | B2 | 3/2022 | Hu et al. |
| 11,502,373 | B2 | 11/2022 | Kim et al. |
| 2010/0015530 | A1 | 1/2010 | Katayama et al. |
| 2010/0248026 | A1 | 9/2010 | Hinoki et al. |
| 2010/0291430 | A1* | 11/2010 | Lee ............. H01M 10/052 429/129 |
| 2012/0015228 | A1 | 1/2012 | Yoon et al. |
| 2014/0205884 | A1* | 7/2014 | Wohrle ........... H01M 50/451 429/145 |
| 2014/0308565 | A1 | 10/2014 | Lee et al. |
| 2015/0050544 | A1* | 2/2015 | Nam ............... H01M 50/411 429/144 |
| 2015/0303003 | A1 | 10/2015 | Ha et al. |
| 2016/0141581 | A1* | 5/2016 | Sasaki ............ H01M 50/443 429/144 |
| 2016/0149185 | A1* | 5/2016 | Yoon ............. H01M 50/443 429/144 |
| 2016/0285064 | A1* | 9/2016 | Hatta ............... H01M 10/44 |
| 2017/0012264 | A1* | 1/2017 | Carlson ........... H01M 50/446 |
| 2017/0117525 | A1* | 4/2017 | Suzuki ........... H01M 50/446 |
| 2017/0338459 | A1 | 11/2017 | Nakahiro et al. |
| 2018/0123106 | A1 | 5/2018 | Shin et al. |
| 2018/0233727 | A1 | 8/2018 | Sakural et al. |
| 2018/0294455 | A1 | 10/2018 | Sakimoto et al. |
| 2019/0044118 | A1 | 2/2019 | Sakurai et al. |
| 2019/0280274 | A1 | 9/2019 | Kim et al. |
| 2020/0075910 | A1 | 3/2020 | Kim et al. |
| 2020/0119323 | A1 | 4/2020 | Ko et al. |
| 2020/0266415 | A1 | 8/2020 | Lee et al. |
| 2020/0335759 | A1 | 10/2020 | Lane et al. |
| 2021/0005858 | A1 | 1/2021 | Kim et al. |
| 2021/0057705 | A1 | 2/2021 | Lee et al. |
| 2021/0226299 | A1 | 7/2021 | Choi et al. |

FOREIGN PATENT DOCUMENTS

| | | |
|---|---|---|
| CN | 104124414 A | 10/2014 |
| CN | 105594014 A | 5/2016 |
| CN | 105609689 A | 6/2016 |
| CN | 108137842 A | 6/2018 |
| CN | 108352482 A | 7/2018 |
| CN | 108550766 A | 9/2018 |
| CN | 108780866 A | 11/2018 |
| CN | 110112353 A | 8/2019 |
| CN | 110233223 A | 9/2019 |
| CN | 110875452 A | 3/2020 |
| JP | 2005-276503 A | 10/2005 |
| JP | 2009-019118 A | 1/2009 |
| JP | 2010-103050 A | 5/2010 |
| JP | 2013-020769 A | 1/2013 |
| JP | 5355823 B2 | 11/2013 |
| JP | 5497245 B2 | 5/2014 |
| JP | 2014-149935 | 8/2014 |
| JP | 2014-179279 A | 9/2014 |
| JP | 6054001 B2 | 12/2016 |
| JP | 2018-133246 A | 8/2018 |
| JP | 2018-137140 A | 8/2018 |
| KR | 10-2012-0097238 A | 9/2012 |
| KR | 2013-0105449 A | 9/2013 |
| KR | 2015-0039379 A | 4/2015 |
| KR | 10-2016-0065692 A | 6/2016 |
| KR | 10-2016-0109669 A | 9/2016 |
| KR | 10-2017-0024574 A | 3/2017 |
| KR | 2017-0129637 | 11/2017 |
| KR | 2017-0129641 | 11/2017 |
| KR | 2017-0129646 | 11/2017 |
| KR | 2019-0022917 | 3/2019 |
| KR | 10-2019-0062924 A | 6/2019 |
| KR | 10-2019-0093444 A | 8/2019 |
| KR | 10-2020-0032542 A | 3/2020 |
| WO | WO 10/117195 A2 | 10/2010 |
| WO | WO 2013-151134 A1 | 10/2013 |
| WO | WO 2018-040904 A1 | 3/2018 |
| WO | WO 19/164130 | 8/2019 |

OTHER PUBLICATIONS

"Comprehensive Guide on Polyvinylidene Fluoride (PVDF)." Polyvinylidene Fluoride (PVDF)—Material Properties Other Info, https://omnexus.specialchem.com/selection-guide/polyvinylidene-fluoride-pvdf-plastic. https://omnexus.specialchem.com/selection-guide/polyvinylidene-fluoride-pvdf-plastic (Year: 2022).*
"Comprehensive Guide on Polyethylene (PE)." Polyethylene (PE)—Properties, Uses Application, https://omnexus.specialchem.com/selection-guide/polyethylene-plastic. https://omnexus.specialchem.com/selection-guide/polyethylene-plastic (Year: 2022).*
What is PMMA?, AcmePlastics.com, https://www.acmeplastics.com/what-is-pmma#:~:text=PMMA%20has%20a%20melting%20point,has%20a%20high%20scratch%20resistance. (Year: 2022).*
Polyacrylonitrile, Chemicalbook.com, https://www.chemicalbook.com/ChemicalProductProperty_EN_CB9199592.htm (Year: 2022).*
Extended European Search Report dated Sep. 24, 2021 in corresponding European patent application No. 21168221.6, 11 pp.
Office Action dated Nov. 15, 2022 in corresponding Chinese patent application No. 202110393293.4, 27 pp.
Office Action dated Feb. 14, 2023 in corresponding Korean patent application No. 10-2020-0044788.
Journal of Plastics, Aug. 30, 2002, 30th Anniversary General Title List, 15 pp.
Zhang et al., 2020, Study on the Stability of Ceramic Coating Slurry for Lithium Battery Separator, Chinese Academic Journal Electronic Publishing House, DOI:10.16009/j.cnki.cn13-1295/tq.2020.04.003, 4 pp.
Second office action dated Apr. 29, 2022 in corresponding Chinese patent application No. 202110393293.4, 11 pp.
Notification to go through the Formalities of Registration and Notification to Grant Patent Right dated Oct. 13, 2023 in corresponding Chinese patent application No. 202110393293.4.

* cited by examiner

PE wax

Network structure

SEPARATOR AND LITHIUM BATTERY INCLUDING THE SAME

CROSS-REFERENCE TO RELATED APPLICATION

This application claims priority to and the benefit of Korean Patent Application No. 10-2020-0044788, filed on Apr. 13, 2020, in the Korean Intellectual Property Office, the disclosure of which is incorporated herein in its entirety by reference.

BACKGROUND

1. Field

One or more embodiments relate to a separator and a lithium battery employing the same.

2. Description of Related Technology

In order to meet the miniaturization and high performance of various devices, the miniaturization and weight reduction of lithium batteries have become important. In addition, for application to fields such as electric vehicles, the discharge capacity, energy density, and cycle characteristics of lithium batteries have become important. In order to meet the above use, lithium batteries having high discharge capacity per unit volume, high energy density, and excellent lifespan characteristics are required.

SUMMARY

One or more embodiments provide a separator capable of securing battery stability by maintaining a coating layer having a network structure at high temperature.

One or more embodiments provide a lithium battery including the separator.

Additional aspects will be set forth in part in the description which follows and, in part, will be apparent from the description, or may be learned by practice of the presented embodiments of the disclosure.

According to one or more embodiments, a separator includes a porous substrate, and a coating layer disposed on one surface of the porous substrate and including an organic particle having a melting point (Tm) of about 100°C to about 130°C, a binder having a melting point higher than the melting point of the organic particle by 30°C or more, and an inorganic particle.

According to one or more embodiments, a lithium battery includes an electrode assembly including a cathode; an anode; and the separator disposed between the cathode and the anode.

According to one or more alternative embodiments, a separator for a lithium battery is provided. The separator comprises a porous substrate, and a coating layer disposed on a surface of the porous substrate, the coating layer comprising organic particles, a binder and inorganic particles, the organic particles having a melting point of about 100°C to about 130°C, the binder having a melting point higher than the melting point of the organic particles by about 30°C or more. The melting point of the binder may be about 160°C or higher. The melting point of the binder may be about 160°C to about 180°C.

According to one or more alternative embodiments of the separator, the organic particles may be coated by the binder or the organic particles may be embedded in the binder. The binder may have a matrix form of a network structure. The organic particles may comprise at least one selected from the group consisting of polyethylene (PE), polypropylene (PP), polystyrene (PS), polyvinylidene fluoride (PVDF), polymethyl methacrylate (PMMA), an acrylate compound, polyacrylonitrile (PAN), an azodicarbonamide compound, derivatives thereof, and copolymers thereof. The binder may comprise at least one selected from the group consisting of a sulfonate compound and a derivative thereof, an acrylamide compound and a derivative thereof, an acrylonitrile compound and a derivative thereof, copolymers thereof, and mixtures thereof.

According to one or more alternative embodiments of the separator, a content of the binder may be in a range of about 1 wt % to about 15 wt % based on a total weight of the organic particles and the binder. A content of the organic particles may be in a range of more than about 50 wt % based on a total weight of the organic particles and the inorganic particles. A weight ratio of the organic particles and the inorganic particles may be about 60:40 to about 80:20. The inorganic particles may comprise at least one selected from the group consisting of alumina ($Al_2O_3$), boehmite, BaSO4, MgO, $Mg(OH)_2$, clay, silica ($SiO_2$), and $TiO_2$. The coating layer may have a thickness of about 0.1 μm to about 5.0 μm.

According to one or more alternative embodiments, the separator may further comprise an electrode adhesive layer on the coating layer. The electrode adhesive layer may have a thickness of about 0.1 μm to about 5.0 μm.

According to one or more alternative embodiments, a lithium battery is provided. The lithium battery comprises an electrode assembly comprising a cathode, an anode, and a separator interposed between the cathode and the anode, the separator comprising a porous substrate, and a coating layer disposed on a surface of the porous substrate, the coating layer comprising organic particles, a binder and inorganic particles, the organic particles having a melting point of the organic particles of about 100°C to about 130°C, the binder having a melting point higher than the melting point of the organic particles by about 30°C or more. The electrode assembly may be wound in a jelly roll shape.

According to one or more alternative embodiments, a separator for a lithium battery is provided. The separator comprises a porous substrate and a coating layer disposed on a surface of the porous substrate, the coating layer comprising organic particles, a binder and inorganic particles, the organic particles having a melting point, the binder having a melting point higher than the melting point of the organic particles, wherein the organic particles are coated with or embedded in the binder. The melting point of the binder may be higher than the melting point of the organic particles by about 30°C or more. The melting point of the organic particles may be about 100°C to about 130°C and the melting point of the binder may be about 160°C to about 180°C.

BRIEF DESCRIPTION OF THE DRAWINGS

The above and other aspects, features, and advantages of certain embodiments of the disclosure will be more apparent from the following description taken in conjunction with the accompanying drawings.

FIG. 5 is an enlarged view of FIG. 4.

DETAILED DESCRIPTION

Figure 1A:
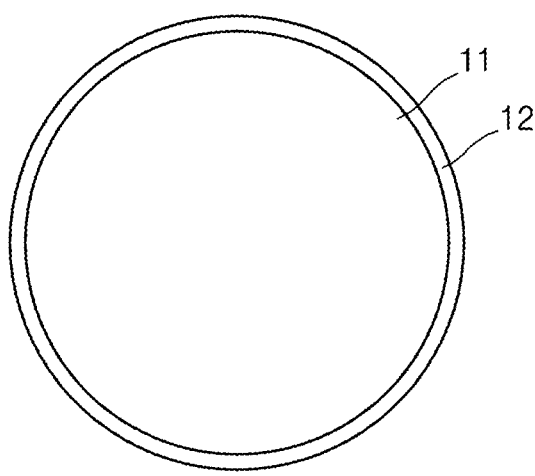
FIG. 1A is a schematic view illustrating a coating form of an organic particle and a binder used in a separator according to an embodiment.

In a lithium battery, a separator is disposed between a cathode and an anode to prevent a short circuit. An electrode assembly including a cathode, an anode, and a separator disposed between the cathode and the anode is wound to have a jelly roll shape. In the electrode assembly, a jelly roll is rolled to improve adhesive force between the anode/cathode and the separator.

As a separator for lithium batteries, olefin-based polymers are widely used. Although olefin-based polymers have excellent flexibility, they have low strength when immersed in an electrolyte solution, and a short circuit of the battery may occur due to rapid thermal contraction at a high temperature of 100° C. or higher. In order to solve this problem, for example, a separator in which a shutdown function is added using polyethylene wax on a porous olefin-based polymer substrate has been proposed. However, in a separator coated with polyethylene wax, the polyethylene wax is melted at a high temperature, the coating layer cannot be maintained, so that the contact surface of an electrode plate increases and thermal runaway increases.

Accordingly, there is a need for a separator capable of improving battery stability at high temperatures.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present inventive concept will now be described more fully with reference to the accompanying drawings, in which example embodiments are illustrated. The present inventive concept may, however, be embodied in many different forms, should not be construed as being limited to the embodiments set forth herein, and should be construed as including all modifications, equivalents, and alternatives within the scope of the present inventive concept; rather, these embodiments are provided so that this inventive concept will be thorough and complete, and will fully convey the effects and features of the present inventive concept and ways to implement the present inventive concept to those skilled in the art.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element are arbitrarily exaggerated or reduced for better understanding or ease of description, and thus the present inventive concept is not limited thereto. Throughout the written description and drawings, like reference numbers and labels will be used to denote like or similar elements. Throughout the written description and drawings, when an element such as a layer, a film, a region or a component is referred to as being "on" another layer or element, it can be "directly on" the other layer or element, or intervening layers, regions, or components may also be present. Although the terms "first", "second", "third", etc., may be used herein to describe various elements, components, regions, and/or layers, these elements, components, regions, and/or layers should not be limited by these terms. These terms are used only to distinguish one component from another, not for purposes of limitation.

Hereinafter, a separator according to embodiments and a lithium battery employing the same will be described in more detail.

A separator according to an embodiment includes
a porous substrate, and
a coating layer disposed on one surface of the porous substrate and including an organic particle having a melting point (or a melting point of the organic particles) (Tm) of about 100°C to about 130°C, a binder having a melting point (or a melting point of the binder) higher than the melting point of the organic particle by about 30°C or more, and an inorganic particle. In some embodiments, the coating layer may include organic particles, inorganic particles and a binder, wherein the organic particles have a melting point, and the binder has a melting point higher than the melting point of the organic particles. In these embodiments, the melting point of the binder may be higher than the melting point of the organic particles by about 30°C or more. Furthermore, the melting point of the organic particles may be about 100°C to about 130°C, and the melting point of the binder may be about 160°C to about 180°C.

Since the separator may include a coating layer including an organic particle having a melting point (Tm) of about 100°C to about 130°C and a binder having a melting point higher than the melting point of the organic particle by about 30°C or more on one surface or both surfaces of the porous substrate, even if the organic particle in the coating layer are melted after leaving at high temperature, the shape of the coating layer having a network structure can be maintained by the binder having a higher melting point, thereby delaying a rapid increase in temperature and heat generation when shutdown occurs. Accordingly, a lithium battery having improved high-temperature stability may be provided.

In the case of a conventional coating separator, in order to solve a problem of short circuit of a battery due to rapid thermal contraction at high temperature, for example, a method of adding a shutdown function using polyethylene wax on a porous substrate has been proposed. However, since the applied polyethylene wax is melted at a high temperature not to maintain a coating layer, the contact surface of an electrode plate of the separator may increase, and thermal runaway may increase.

Figure 1B:
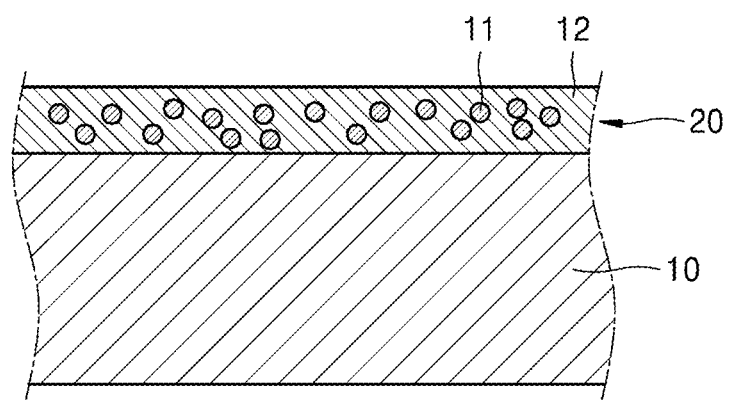
FIG. 1B is a schematic view illustrating a separator according to an embodiment where organic particles are embedded in the binder.
Figure 7:
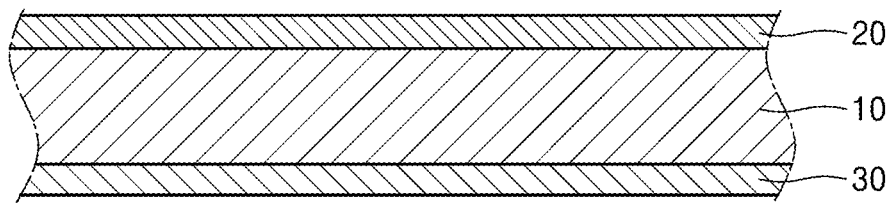
FIG. 7 is an exemplary schematic cross-sectional view of a separator according to an embodiment.

In contrast, in the separator according to an embodiment, since the organic particles 11 are mixed with the binder 12 having a large difference in melting point (Tm) and the porous substrate is coated with the mixture, the binder 12 may be in a state in which the binder 12 coats the organic particles 11 or a state in which the organic particles 11 are embedded in the binder 12. FIG. 1A is a schematic view illustrating a separator according to an embodiment where an organic particle 11 in a coating layer is coated with a binder 12. FIG. 1B is a schematic view illustrating a separator according to an embodiment where organic particles 11 are embedded in the binder 12. Referring to FIG. 1B, the coating layer 20 is disposed on the porous substrate 10, and the organic particle 11 in the coating layer 20 is coated with a binder 12. FIG. 7 is a schematic view illustrating a separator according to an embodiment. Referring to FIG. 7, the coating layers 20, 30 may be disposed on both surface of the porous substrate 10.

Figure 2:
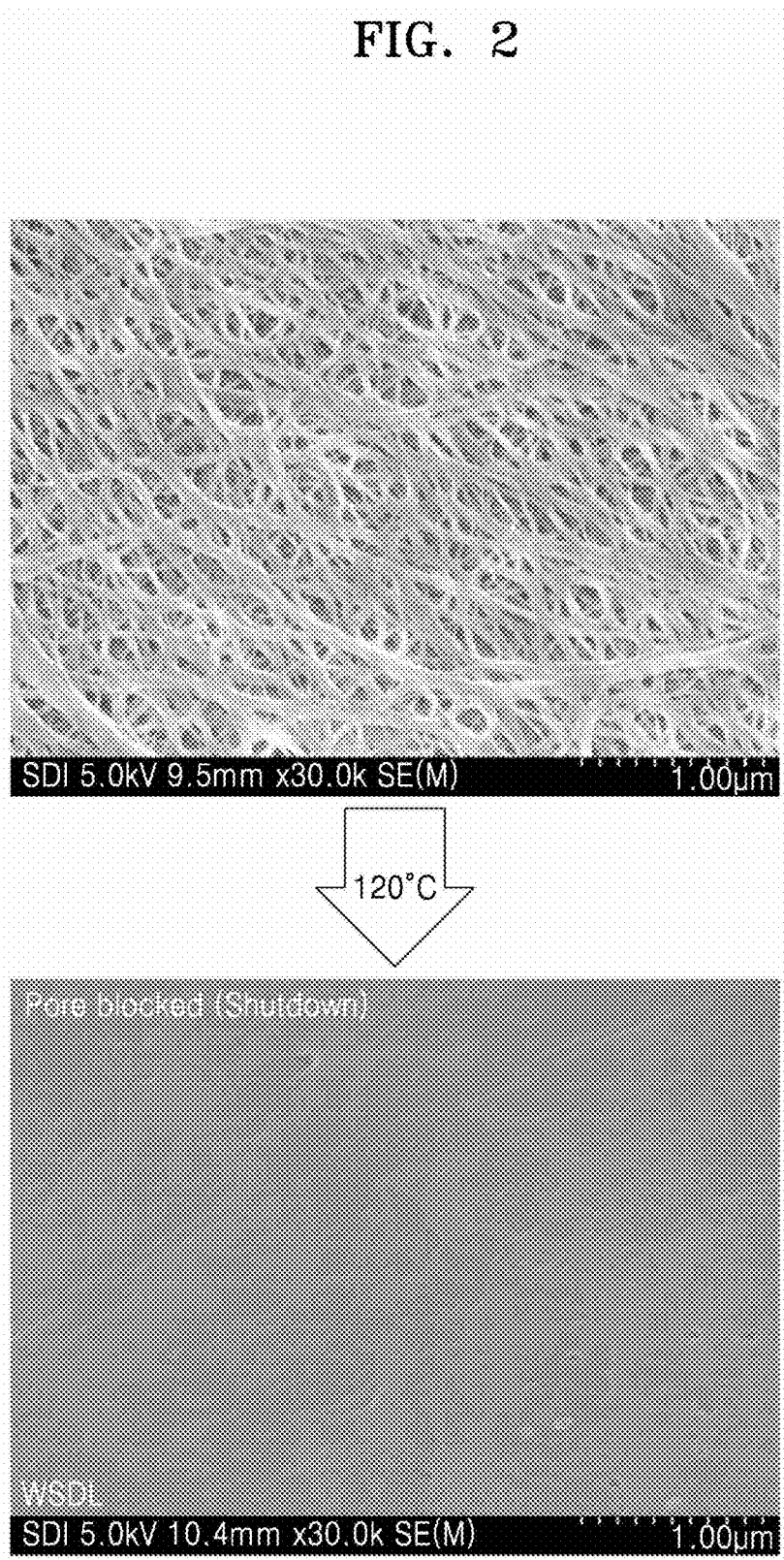
FIG. 2 is an exemplary image illustrating the shutdown action of a general separator.

When the separator coated with the organic particles and the binder is exposed to high temperatures, the organic particles melt, permeate into the porous substrate, and block the pores of the porous substrate, thereby inhibiting the movement of current, thereby improving thermal stability. FIG. 2 is an exemplary image illustrating the shutdown action of a general separator. When the separator according to an embodiment is exposed to high temperatures, the organic particles melt and penetrate into the porous substrate, and thus a shutdown of blocking the pores of the porous substrate may occur. Meanwhile, even when the organic particles melt, the binder having a high melting point in the coating layer may maintain a matrix form of a network structure in a state where pores remain in the sites from which the organic particle was discharged, thereby preventing the collapse of the coating layer. Accordingly, in the separator according to an embodiment, the coating layer may be maintained when shutdown occurs at high temperatures, and thus an increase in contact surface of an electrode plate may be inhibited and a rapid increase of temperature and heat generation may be delayed, thereby improving the high-temperature stability of a lithium battery.

In the coating layer, at least one surface of the porous substrate may be coated, and one surface or both surfaces thereof may be coated.

The organic particle included in the coating layer may have a melting point (Tm) of about 100°C to about 130°C, for example, about 110°C to about 125°C. When the melting point of the organic particle is lower than about 100°C, the organic particles melt due to sudden heat generation and a change in external environment, so that pores of the separator are blocked to reduce the output of the battery and to make it difficult to use, which may adversely affect battery performance. Further, when the melting point of the organic particle is higher than about 130°C, melt down of the separator occurs, and thus it is difficult to exert a shutdown effect due to the organic particle. It may be preferable that the organic particle may have a melting point in a range similar to that of a porous substrate.

The organic particles having a melting point (Tm) of about 100° C. to about 130° C. applied on the porous substrate are melted after being exposed to a high temperature, such as about 120° C., to block the pores of the porous substrate, thereby inhibiting the movement of current to improve the stability of the lithium battery.

Such an organic particle may include at least one selected from polyethylene (PE), polypropylene (PP), polystyrene (PS), polyvinylidene fluoride (PVDF), polymethyl methacrylate (PMMA), an acrylate compound, polyacrylonitrile (PAN), an azodicarbonamide compound, derivatives thereof, and copolymers thereof. For example, the organic particle may include, but is not limited to, at least one selected from polyethylene, polypropylene, polystyrene, and polymethyl methacrylate. For example, the organic particle may include polyethylene. The above organic particles are merely examples, and other organic particles are also possible.

According to an embodiment, the organic particle may have at least one shape selected from a particle shape, a plate shape, a flake shape, and a combination thereof.

The binder included in the coating layer may have a melting point higher than the melting point of the organic particles by about 30° C. or more. For example, the binder may have a melting point higher than the melting point of the organic particles by about 30° C. or more, about 40° C. or more, about 50° C. or more, about 60° C. or more, about 70° C. or more, about 80° C. or more, about 90° C. or more, or about 100° C. or more. For example, the melting point of the binder may be about 160° C. to about 180° C. For example, the melting point of the binder may be about 165° C. to about 175° C. For example, the melting point of the binder may be about 170° C. The above melting points are merely examples, and other melting points are also possible. As described above, since the binder has a high melting point within the above range, even when the separator is exposed to high temperatures, the binder has high heat resistance and may thus maintain a matrix form of a network structure.

The binder, which is a high-temperature-resistance binder, may include, but is not limited to, at least one selected from a sulfonate compound and a derivative thereof, an acrylamide compound and a derivative thereof, an acrylonitrile compound and a derivative thereof, copolymers thereof, and mixtures thereof. For example, the binder may include a copolymer of a sulfonate compound or a derivative thereof, an acrylamide compound or a derivative thereof, or an acrylonitrile compound or a derivative thereof.

According to an embodiment, the binder may include a (meth)acrylic copolymer including a first structural unit and a second structural unit. The first structural unit is derived from (meth)acrylamide, and the second structural unit is selected from structural units derived from (meth)acrylic acid and (meth)acrylate and structural units derived from (meth)acrylamidosulfonic acid and salts thereof.

The first structural unit may be included in an amount of about 55 mol % to about 95 mol % based on 100 mol % of the (meth)acrylic copolymer, and the second structural unit may be included in an amount of about 5 mol % to about 45 mol % based on 100 mol % of the (meth)acrylic copolymer. The first structural unit derived from the (meth)acrylamide includes an amide functional group (—NH₂) in the structural unit. The —NH₂ functional group may improve adhesive characteristics between the porous substrate and the electrode, and may more firmly fix the inorganic particles in the coating layer by forming a hydrogen bond with an —OH functional group of the inorganic particles to be described later, thereby enhancing the heat resistance of the separator.

The structural unit derived from the (meth)acrylic acid and (meth)acrylate included in the second structural unit may serve to fix the inorganic particles on the porous substrate, and simultaneously may provide an adhesive force to allows the coating layer to adhere well to the porous substrate and electrode, and may contribute to the improvement of heat resistance and air permeability of the separator. Further, the structural unit derived from the (meth)acrylic acid and (meth)acrylate may include a carboxyl functional group (—C(=O)O—) in the structural unit, and the carboxyl functional group may contribute to the improvement of dispersibility of a coating slurry.

Moreover, the structural unit derived from the (meth)acrylamidosulfonic acid and its salt included in the second structural unit may include a bulky functional group, thereby reducing the mobility of a copolymer including the bulky functional group to enhance the heat resistance of the separator.

In an embodiment, the first structural unit may be included in an amount of about 75 mol % to about 95 mol %, for example, about 80 mol % to about 95 mol %, based on 100 mol % of the (meth)acrylic copolymer. The above amounts are merely examples, and other amounts are also possible.

Meanwhile, among the second structural units, the structural unit derived from (meth)acrylic acid and (meth)acrylate may be included in an amount of about 0 mol % to about 40 mol % based on 100 mol % of the (meth)acrylic copolymer, and the structural unit derived from the (meth)acrylamidosulfonic acid and its salt may be included in an amount of about 0 mol % to about 10 mol % based on 100 mol % of the (meth)acrylic copolymer. The above amounts are merely examples, and other amounts are also possible.

For example, the structural unit derived from the (meth)acrylamide may be included in an amount of about 90 mol % to about 95 mol % based on 100 mol % of the (meth)acrylic copolymer, the structural unit derived from the (meth)acrylic acid and (meth)acrylate may be included in an amount of about 0 mol % to about 5 mol % based on 100 mol % of the (meth)acrylic copolymer, and the structural unit derived from the (meth)acrylamidosulfonic acid and its salt may be included in an amount of about 0 mol % to about 5 mol % based on 100 mol % of the (meth)acrylic copolymer. The above amounts are merely examples, and other amounts are also possible.

When the content of each of the structural units is within the above range, heat resistance and adhesive force of the separator may be further improved.

The first structural unit derived from the (meth)acrylamide may be, for example, represented by Formula 1 below.

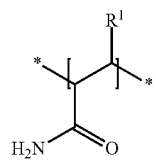

[Formula 1]

in Formula 1, $R^1$ is hydrogen or a C1 to C6 alkyl group.

The structural unit derived from the (meth)acrylic acid and (meth)acrylate may be, for example, represented by any one of Formulae 2 and 3 and a combination thereof.

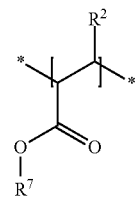

[Formula 2]

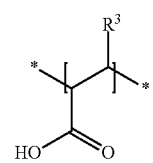

[Formula 3]

In Formulae 2 and 3, $R^2$ and $R^3$ are each independently hydrogen or a C1 to C6 alkyl group, and $R^7$ is a substituted or unsubstituted C1 to C20 alkyl group.

The structural unit derived from (meth)acrylate may be derived from (meth)acrylic acid alkyl ester, (meth)acrylic acid perfluoroalkyl ester, and (meth)acrylate having a functional group in the side chain, and, for example, may be derived from (meth)acrylic acid alkyl ester. The number of carbon atoms in the alkyl group or perfluoroalkyl group bonded to a noncarbonyl oxygen atom of the (meth)acrylic acid alkyl ester or (meth)acrylic acid perfluoroalkyl ester may be specifically 1 to 20, more specifically 1 to 10, for example, 1 to 5.

Some examples of the (meth)acrylic acid alkyl ester or (meth)acrylic acid perfluoroalkyl ester having 1 to 5 carbon atoms in the alkyl group or perfluoroalkyl group bonded to the noncarbonyl oxygen atom may include acrylic acid alkyl esters such as methyl acrylate, ethyl acrylate, n-propyl acrylate, isopropyl acrylate, n-butyl acrylate, and t-butyl acrylate; acrylic acid-2-(perfluoroalkyl) ethyl such as acrylic acid-2-(perfluorobutyl) ethyl and acrylic acid-2-(perfluoropentyl) ethyl; methacrylate alkyl esters such as methyl methacrylate, ethyl methacrylate, n-propyl methacrylate, isopropyl methacrylate, n-butyl methacrylate, and t-butyl methacrylate; and methacrylic acid-2-(perfluoroalkyl) ethyl such as methacrylic acid-2-(perfluorobutyl) ethyl and methacrylic acid-2-(perfluoropentyl) ethyl. The above are merely examples, and others are also possible.

Examples of other (meth)acrylic acid alkyl esters or (meth)acrylic acid perfluoroalkyl ester may include acrylic acid alkyl esters each having 6 to 18 carbon atoms in the alkyl group bonded to the noncarbonyl oxygen atom, such as n-hexyl acrylate, 2-ethylhexyl acrylate, nonyl acrylate, lauryl acrylate, stearyl acrylate, cyclohexyl acrylate, and isobornyl acrylate; methacrylic acid alkyl esters each having 6 to 18 carbon atoms in the alkyl group bonded to the noncarbonyl oxygen atom, such as n-hexyl methacrylate, 2-ethylhexyl methacrylate, octyl methacrylate, isodecyl methacrylate, lauryl methacrylate, tridecyl methacrylate, stearyl methacrylate, and cyclohexyl methacrylate; acrylic acid-2-(perfluoroalkyl) ethyl each having 6 to 18 carbon atoms in the perfluoroalkyl group bonded to the noncarbonyl oxygen atom, such as acrylic acid-2-(perfluorohexyl)ethyl, acrylic acid-2-(perfluorooctyl) ethyl, acrylic acid-2-(perfluorononyl) ethyl, acrylic acid-2-(perfluorodecyl) ethyl, acrylic acid-2-(perfluorododecyl) ethyl, acrylic acid-2-(perfluorotetradecyl) ethyl, acrylic acid-2-(perfluorohexadecyl) ethyl; and methacrylic acid-2-(perfluoroalkyl) ethyl each having 6 to 18 carbon atoms in the perfluoroalkyl group bonded to the noncarbonyl oxygen atom, such as methacrylic acid-2-(perfluorohexyl) ethyl, methacrylic acid-2-(perfluorooctyl) ethyl, methacrylic acid-2-(perfluorononyl) ethyl, methacrylic acid-2-(perfluorodecyl) ethyl, methacrylic acid-2-(perfluorododecyl) ethyl, methacrylic acid-2-(perfluorotetradecyl) ethyl, and methacrylic acid-2-(perfluorohexadecyl) ethyl. The above are merely examples, and others are also possible.

For example, the structural unit derived from (meth)acrylic acid or (meth)acrylate may include a structural unit represented by Formula 2 and a structural unit represented by Formula 3, respectively, or may include both a structural unit represented by Formula 2 and a structural unit represented by Formula 3. When the structural unit includes both the structural unit represented by Formula 2 and the structural unit represented by Formula 3, the structural unit represented by Formula 2 and the structural unit represented by Formula 3 may be included at a molar ratio of about 10:1 to about 1:1, for example, about 6:1 to about 1:1, or about 3:1 to about 1:1. The above molar ratios are merely examples, and other molar ratios are also possible.

The structural unit derived from the (meth)acrylamidosulfonic acid and its salt may be a structural unit derived from (meth)acrylamidosulfonic acid or (meth)acrylamidosulfonate, and the (meth)acrylamidosulfonate may be a conjugate base of (meth)acrylamidosulfonic acid, (meth)acrylamidosulfonate, or a derivative thereof. The structural unit derived from the (meth)acrylamidosulfonic acid or (meth)acrylamidosulfonate may be represented by any one of Formula 4, Formula 5, Formula 6, and combinations thereof.

[Formula 4]

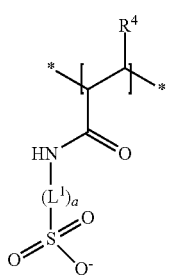

[Formula 5]

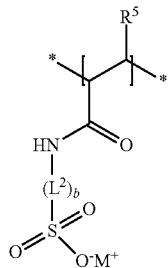

[Formula 6]

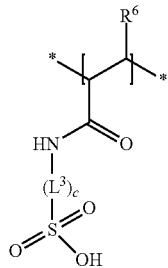

In Formulae 4 to 6, $R^4$, $R^5$ and $R^6$ are each independently hydrogen or a C1 to C6 alkyl group, $L^1$, $L^2$, and $L^3$ are each independently a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, a, b, and c are each independently an integer of 0 to 2, M is an alkali metal, and the alkali metal may be, for example, lithium, sodium, potassium, rubidium, or cesium.

For example, in Formulae 4 to 6, $L^1$, $L^2$, and $L^3$ are each independently a substituted or unsubstituted C1 to C10 alkylene group, and a, b and c are each independently 1.

The structural unit derived from the (meth)acrylamidosulfonic acid and its salt may include each of a structural unit represented by Formula 4, a structural unit represented by Formula 5, and a structural unit represented by Formula 6, or may include two or more thereof together. For example, the structure unit may include a structural unit represented by Formula 5. For another example, the structure unit may include both a structural unit represented by Formula 5 and a structural unit represented by Formula 6.

The structural unit substituted with an alkali metal ($M^+$) in the (meth)acrylic copolymer may be included in an amount of about 50 mol % to about 100 mol %, for example, about 60 mol % to about 90 mol %, based on 100 mol % of the total amount of the (meth)acrylamidosulfonic acid structural unit. When the above range is satisfied, the (meth)acrylic copolymer and the separator including the same may exhibit excellent adhesion, heat resistance, and oxidation resistance.

When the structure unit may include both a structural unit represented by Formula 5 and a structural unit represented by Formula 6, the structural unit represented by Formula 5 and the structural unit represented by Formula 6 may be included at a molar ratio of about 10:1 to about 1:2, for example, about 5:1 to about 1:1, or about 3:1 to about 1:1. The above molar ratios are merely examples, and other molar ratios are also possible.

The sulfonic acid group or the sulfonate group in the structural unit derived from the (meth)acrylamidosulfonic acid and a salt thereof may be, for example, vinyl sulfonic acid, allyl sulfonic acid, styrene sulfonic acid, anethol sulfonic acid, acrylamidoalkane sulfonic acid, sulfoalkyl (meth)acrylate, or a functional group derived from a salt thereof.

Here, the alkane may be a C1 to C20 alkane, a C1 to C10 alkane, or a C1 to C6 alkane, and the alkyl may be a C1 to C20 alkyl, a C1 to C10 alkyl, or a C1 to C6 alkyl. The salt refers to a salt composed of the aforementioned sulfonic acid and appropriate ions. The ions may be, for example, alkali metal ions, and in this case, the salt may be an alkali metal sulfonic acid salt.

The acrylamidoalkane sulfonic acid may be, for example, 2-acrylamido-2-methylpropane sulfonic acid, and the sulfoalkyl (meth)acrylate may be, for example, 2-sulfoethyl (meth)acrylate, 3-sulfopropyl (meth)acrylate, or the like.

The (meth)acrylic copolymer may be represented by Formula 7 below.

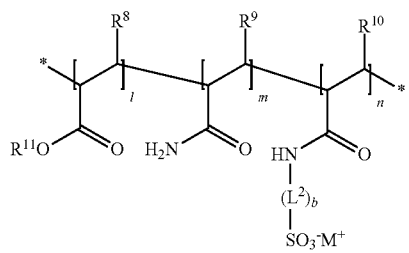

[Formula 7]

In Formula 7, $R^8$ to $R^{10}$ are each independently hydrogen or a methyl group, $R^{11}$ is hydrogen or a C1 to C6 alkyl group, $L^2$ is a substituted or unsubstituted C1 to C10 alkylene group, a substituted or unsubstituted C3 to C20 cycloalkylene group, a substituted or unsubstituted C6 to C20 arylene group, or a substituted or unsubstituted C3 to C20 heterocyclic group, b is an integer of 0 to 2, M is an alkali metal such as lithium, sodium, potassium, rubidium, or cesium, and each of l, m, and n refers to a molar ratio of each unit.

For example, in Formula 7, $1+m+n=1$ may be satisfied. Further, $0.05 \le (l+n) \le 0.45$ and $0.55 \le m \le 0.95$ may be satisfied. Specifically, $0 \le l \le 0.4$ and $0 \le n \le 0.1$ may be satisfied, and for example, $0.9 \le m \le 0.95$, $0 \le l \le 0.05$, and $0 \le n \le 0.05$ may be satisfied.

For example, in Formula 7, $L^2$ may be a substituted or unsubstituted C1 to C10 alkylene group, and b may be 1.

The (meth)acrylic copolymer may further include other units in addition to the above-described units. For example, the (meth)acrylic copolymer may further include a unit derived from an alkyl (meth)acrylate, a unit derived from diene, a unit derived from styrene, an ester group-containing unit, a carbonate group-containing unit, or a combination thereof.

The (meth)acrylic copolymer may have various forms, such as an alternating polymer in which the units are alternately distributed, a random polymer in which the units are randomly distributed, or a graft polymer in which some of the units are grafted.

The weight average molecular weight of the (meth)acrylic copolymer may be about 350,000 to about 970,000, for example, about 450,000 to about 970,000, or about 450,000 to about 700,000. When the weight average molecular weight of the (meth)acrylic copolymer satisfies the above range, the (meth)acrylic copolymer and the separator including the same may exhibit excellent adhesion, heat resistance, and air permeability. The weight average molecular weight may be a polystyrene-reduced average molecular weight measured using gel permeation chromatography.

The (meth)acrylic copolymer may be prepared by various known methods such as emulsion polymerization, suspension polymerization, mass polymerization, solution polymerization, and bulk polymerization.

The content of the binder may be in a range of about 1 wt % to about 15 wt % by weight based on the total weight of the organic particles and the binder. For example, the content of the binder may be about 3 wt % to about 12 wt %, about 5 wt % to 10 wt %, or 6 wt % to 8 wt % based on the total weight of the organic particles and the binder. In the above range, a matrix having a network structure surrounding the organic particles may be formed by effectively coating the surface of the organic particle.

The coating layer includes inorganic particles. Since the coating layer includes the inorganic particles, the possibility of occurrence of a short circuit between the cathode and the anode decreases, and thus stability of the battery may be improved.

The inorganic particles included in the coating layer may be metal oxide particles, metalloid oxide particles, or a combination thereof. Specifically, the inorganic particles may include alumina, titania, boehmite, barium sulfate, calcium carbonate, calcium phosphate, amorphous silica, crystalline glass particles, kaolin, talc, silica-alumina composite oxide particles, calcium fluoride, lithium fluoride, zeolite, molybdenum sulfide, mica, or magnesium oxide. The inorganic particles may include, for example, $Al_2O_3$, $SiO_2$, $TiO_2$, $SnO_2$, $CeO_2$, $NiO$, $CaO$, $ZnO$, $MgO$, $ZrO_2$, $Y_2O_3$, $SrTiO_3$, $BaTiO_3$, $MgF_2$, $Mg(OH)_2$, or a combination thereof. For example, the inorganic particles may include alumina, titania, boehmite, barium sulfate, or a combination thereof.

The inorganic particles may have a spherical shape, a plate shape, or a fibrous shape, but the shape thereof is not limited thereto, and any shape may be used as long as it may be used in the art. Plate-shaped inorganic particles include, for example, alumina and boehmite. In this case, a decrease in area of the separator at high temperature may be further suppressed, a relatively large number of pores may be secured, and characteristics of the lithium battery may be improved during penetration evaluation. When the inorganic particles have a plate shape or a fibrous shape, the aspect ratio of the inorganic particles may be about 1:5 to about 1:100. For example, the aspect ratio thereof may be about 1:10 to about 1:100. For example, the aspect ratio thereof may be about 1:5 to about 1:50. For example, the aspect ratio thereof may be about 1:10 to about 1:50. The ratio of length of major axis to length of minor axis in the flat surface of the plate-shaped inorganic particle may be about 1 to about 3. For example, the ratio of length of major axis to length of minor axis in the flat surface thereof may be about 1 to about 2. For example, the ratio of length of major axis to length of minor axis in the flat surface thereof may be about 1. The aspect ratio and the ratio of length of major axis to length of minor axis may be measured by scanning electron microscope (SEM). Within the ranges of the aspect ratio and the ratio of length of major axis to length of minor axis, separator contraction may be suppressed, relatively improved porosity may be secured, and penetration characteristics of a lithium battery may be improved. When each of the inorganic particles has a plate shape, the average angle of the flat surfaces of the inorganic particles to one surface of the porous substrate may be about 0□ to about 30□. For example, the angle of flat surface of the inorganic particle to one surface of the porous substrate may converge to about 0□. That is, one surface of the porous substrate and the flat surface of the inorganic particle may be parallel to each other. For example, the average angle of the flat surfaces of the inorganic particles to one surface of the porous substrate is within the above range, thermal contraction of the porous substrate may be effectively prevented, and thus a separator having a reduced contraction rate may be provided.

The average particle diameter of the inorganic particles included in the coating layer may be about 300 nm to about 2 □m, about 300 nm to about 1.5 □m, or about 300 nm to about 1.0 □m. The average particle diameter of the inorganic particles is measured using, for example, a measuring apparatus using a laser diffraction method or a dynamic light scattering method. The average particle diameter of the inorganic particles is measured using, for example, a laser scattering particle size distribution meter (for example, LA-920, manufactured by Horiba Corporation), and is a value of the median particle diameter (D50) when 50% of the inorganic particles are accumulated from small particles in volume conversion. When the inorganic particles having an average particle diameter in this range may be used, both the binding force between the coating layer and the porous substrate and the binding force between the coating layer and the electrode may be improved. Further, when the inorganic particles having an average particle diameter in this range may be used, the separator including the coating layer including the inorganic particles may have an appropriate porosity.

The inorganic particles may be composed of one type of particle having a uniform particle size distribution, and may be composed of two or more types of particles having different particle size distributions. For example, the inorganic particles may be a mixture of two or more types of inorganic particles having different particle size distributions. That is, when the coating layer of the separator includes two or more types of inorganic particles having different particle size distributions, that is, bimodal inorganic particles, inorganic particles having a small particle size may fill the voids between inorganic particles having a large particle size, and thus, a shutdown function may be efficiently performed at high temperature. Through this, it is possible to improve not only the thermal stability of the lithium battery, but also the lifespan characteristics of the lithium battery.

The content of the organic particles in the coating layer may be more than about 50 wt % based on the total weight of the organic particles and the inorganic particles. Within the above range, even when the separator is exposed to high temperature to allow the organic particles to melt to perform a shutdown action, the network structure of the coating layer having high porosity may be maintained to exhibit high air permeability. For example, the content of the organic particles in the coating layer may be about 55 wt % or more, about 60 wt % or more, about 65 wt % or more, or about 70 wt % or more, based on the total weight of the organic particles and the inorganic particles. Further, the content of the organic particles in the coating layer may be about 90 wt % or less, about 85 wt % or less, or about 70 wt % or less, based on the total weight of the organic particles and the inorganic particles. Within the above range, high-temperature stability of the battery may be improved. The above weight percentages for the content of the organic particles are merely examples, and other weight percentages are also possible.

For example, the weight ratio of the organic particles and the inorganic particles in the coating layer may be about 51:49 to about 90:10. For example, the weight ratio of the organic particles and the inorganic particles may be about 55:45 to about 85:15, or about 60:40 to about 80:20. Within the above range, a coating composition having high high-temperature stability may be provided. The above weight ratios are merely examples, and other weight ratios are also possible.

According to an embodiment, the thickness of the coating layer may be about 0.1 □m to about 5.0 □m. For example, the thickness of the coating layer may be about 0.5 □m to about 5.0 □m. For example, the thickness of the coating layer may be about 0.5 □m to about 4.0 □m. For example, the thickness of the coating layer may be about 1 □m to about 4.0 □m. For example, the thickness of the coating layer may be about 2.0 □m to about 4.0 □m. For example, the thickness of the coating layer may be about 2.0 □m to about 3.5 □m. For example, the thickness of the coating layer may be about 3.0 □m to about 5.0 □m. When the thickness of the coating layer satisfies the above range, the separator may provide an improved shutdown function and air permeability. In addition, the thickness of the electrode assembly may be minimized, and thus, the capacity per volume of the battery may be maximized. The above thicknesses are merely examples, and other thicknesses are also possible.

According to an embodiment, the separator may further includes an electrode adhesive layer on the coating layer. The electrode adhesive layer may impart adhesiveness between the separator and the electrode plate.

The electrode adhesive layer may include an additional binder capable of imparting adhesiveness to the electrode plate. According to an embodiment, the electrode adhesive layer may include an aqueous binder having a glass transition temperature (Tg) of 50□C or higher and being present in the form of particles after coating and drying as the additional binder. For example, the aqueous binder may include an acrylate or styrene group, but the present disclosure is not limited thereto.

As the additional binder, a binder having a commonly used binding force may be used. For example, the additional binder may include, but is not limited to, at least one selected from polyvinylidene fluoride, a polyvinylidene fluoride-hexafluoropropylene copolymer, a polyvinylidene fluoride-trichloroethylene copolymer, a polyvinylidene fluoride-chlorotrifluoroethylene copolymer, polymethyl methacrylate, polyacrylonitrile, polyvinylpyrrolidone, polyvinyl acetate, an ethylene vinyl acetate copolymer, polyethylene oxide, cellulose acetate, cellulose acetate butyrate, cellulose acetate propionate, cyanoethyl pullulan, cyanoethyl polyvinyl alcohol, cyanoethyl cellulose, cyanoethyl sucrose, pullulan, carboxyl methyl cellulose, an acrylonitrile styrene butadiene copolymer, and polyimide.

The electrode adhesive layer may include a fluorine-based binder. The fluorine-based binder may be a binder in which some or all of hydrogen atoms connected to carbon is substituted with fluorine atoms. For example, the fluorine-based binder may be a polymer including a repeating unit derived from at least one monomer selected from vinylidine fluoride monomers, ethylene tetrafluoride monomers, and propylene hexafluoride monomers. The fluorine-based binder may be, for example, a fluorine-based homopolymer or a fluorine-based copolymer.

The thickness of the electrode adhesive layer may be about 0.1 □m to about 5.0 □m. For example, the thickness of the electrode adhesive layer may be about 0.1 □m to about 2.0 □m. For example, the thickness of the electrode adhesive layer may be about 0.1 □m to about 0.1 □m. For example, the thickness of the electrode adhesive layer may be about 0.2 μm to about 0.8 μm. For example, the thickness of the electrode adhesive layer may be about 0.3 μm to about 0.5 μm. In the above range, the electrode adhesive layer may effectively provide an adhesive force between the coating layer and the electrode plate. The above thicknesses of the electrode adhesive layer are merely examples and other thicknesses are also possible.

The porous substrate included in the separator may be a porous film containing polyolefin. Polyolefin has an excellent short-circuit prevention effect, and may also improve battery stability through a shutdown effect. For example, the porous substrate may be a film made of a resin such as polyolefin such as polyethylene, polypropylene, polybutene, polyvinyl chloride, or a mixture or copolymer thereof, but the present disclosure is not necessarily limited thereto, and any porous film may be used as long as it is used in the art. For example, as the porous substrate, a porous film made of polyolefin resin, a porous film made of polyolefin fiber, a nonwoven fabric containing polyolefin, or an aggregate of insulating material particles may be used. For example, in the porous film containing polyolefin, applicability of a binder solution for forming the coating layer on the porous substrate is excellent, and film thickness of the separator is reduced to increase the ratio of an active material in the battery, thereby increasing the capacity of the battery per unit volume.

The polyolefin used as the material of the porous substrate may be, for example, a homopolymer such as polyethylene or polypropylene, a copolymer, or a mixture thereof. The polyethylene may be low-density polyethylene, medium-density polyethylene, or high-density polyethylene. From the viewpoint of mechanical strength, high-density polyethylene may be used. In addition, two or more types of polyethylene may be mixed for the purpose of imparting flexibility. The polymerization catalyst used to prepare polyethylene is not particularly limited, and a Ziegler-Natta catalyst, a Phillips catalyst, or a metallocene catalyst may be used. From the viewpoint of achieving both mechanical strength and high permeability, the weight average molecular weight of polyethylene may be about 100,000 to about 12,000,000, for example, about 200,000 to about 3,000,000. The above molecular weights of polyethylene are merely examples and other molecular weights of polyethylene are also possible. Polypropylene may be a homopolymer, a random copolymer, or a block copolymer, and may be used alone or in combination of two or more. Further, the polymerization catalyst is not particularly limited, and a Ziegler-Natta catalyst, a metallocene catalyst, or the like may be used. Also, stereoregularity is not particularly limited, and isotactic, syndiotactic, or atactic may be used, but inexpensive isotactic polypropylene may be used. Within the range not impairing the effects of the present disclosure, polyolefin other than polyethylene or polypropylene, and an additive such as an antioxidant may be added to the polyolefin.

As the porous substrate included in the separator, for example, a multi-layer film of two or more layers including polyolefin such as polyethylene or polypropylene may be used. Further, a mixed multi-layer film such as a two-layer film of polyethylene/polypropylene, a three-layer film of polyethylene/polypropylene/polyethylene, or a three-layer film of polypropylene/polyethylene/polypropylene may be used, but the present disclosure is not limited thereto. Any material or composition may be used as long as it may be used as the material or composition of the porous substrate in the art. The porous substrate included in the separator may include, for example, a diene-based polymer prepared by polymerizing a monomer composition containing a diene-based monomer. The diene-based monomer may be a conjugated diene-based monomer or a non-conjugated diene-based monomer. For example, the diene-based monomer may include, but is not limited to, at least one selected from 1,3-butadiene, isoprene, 2-chloro-1,3-butadiene, 2,3-dimethyl-1,3-butadiene, 2-ethyl-1,3-butadiene, 1,3-pentadiene, chloroprene, vinylpyridine, vinyl norbornene, dicyclopentadiene, and 1,4-hexadiene. Any diene-based monomer may be used as long as it may be used in the art.

The thickness of the porous substrate included in the separator may be about 1 μm to about 100 μm. For example, the thickness of the porous substrate may be about 1 μm to about 30 μm. For example, the thickness of the porous substrate may be about 5 μm to about 20 μm. For example, the thickness of the porous substrate may be about 5 μm to about 15 μm. For example, the thickness of the porous substrate may be about 5 μm to about 10 μm. The above thicknesses of the porous substrate are merely examples and other thicknesses are also possible. When the thickness of the porous substrate is less than 1 μm, the mechanical properties of the separator may be difficult to maintain, and when the thickness of the porous substrate is more than 100 μm, the internal resistance of the lithium battery may increase. The porosity of the porous substrate included in the separator may be about 5% to about 95%. When the porosity is less than about 5%, the internal resistance of the lithium battery may increase, and when the porosity is more than about 95%, the mechanical properties of the porous substrate may be difficult to maintain. The pore size of the porous substrate in the separator may be about 0.01 μm to about 50 μm. For example, the pore size of the porous substrate in the separator may be about 0.01 μm to about 20 μm. For example, the pore size of the porous substrate in the separator may be about 0.01 μm to about 10 μm. The above pore sizes of the porous substrate are merely examples and other pore sizes are also possible. When the pore size of the porous substrate is less than about 0.01 μm, the internal resistance of the lithium battery may increase, and when the pore size of the porous substrate is more than about 50 μm, the mechanical properties of the porous substrate may be difficult to maintain.

As the method of manufacturing the above-described separator, any method may be used as long as it may be used in the art.

For example, the separator may be prepared by the process of: preparing a slurry including organic particles, a binder, and inorganic particles (selectively), applying the slurry onto a porous substrate, and drying and rolling the applied slurry.

The method of applying the slurry is not particularly limited, and any method may be used as long as it may be used in the art. For example, the slurry may be applied by a method such as printing, pressing, press-fitting, roller coating, blade coating, brush coating, dipping coating, spray coating, or flow coating.

A lithium battery according to another embodiment includes a cathode, an anode, and the above-described separator between the cathode and the anode. According to an embodiment, the lithium battery includes an electrode assembly including a cathode, an anode, and the above-described separator between the cathode and the anode, and the electrode assembly may be wound in the form of a jelly roll. Since the lithium battery includes the above-described separator, defective black spots may be reduced to improve quality, and adhesive force between the electrodes (cathode and anode) and the separator may increase to suppress a change in volume during charging and discharging of the lithium battery. Accordingly, deterioration of the lithium battery accompanying the change in volume of the lithium battery may be suppressed, so that the life characteristics of the lithium battery may be improved.

The lithium battery may be manufactured, for example, by the following method.

First, an anode active material composition in which an anode active material, a conductive material, a binder, and a solvent are mixed is prepared. The anode active material composition is directly applied onto a metal current collector to form an anode plate. Alternatively, the anode active material composition may be cast on a separate support, and then a film obtained by peeling from the support may be laminated on a metal current collector to form an anode plate. The shape of the anode is not limited to the shapes listed above, and may have a shape other than the above shapes.

The anode active material may be a non-carbon material. For example, the anode active material may include at least one selected from a metal alloyable with lithium, an alloy of the metal alloyable with lithium, and an oxide of the metal alloyable with lithium. The oxide of the metal alloyable with lithium may include a transition metal oxide or a non-transition metal oxide.

For example, the metal alloyable with lithium may be Si, Sn, Al, Ge, Pb, Bi, or Sb, and the alloy of the metal alloyable with lithium may be a Si—Y alloy (Y is an alkaline metal, an alkaline earth metal, group 13 to 16 elements, a transition metal, or a combination thereof, not Si), or a Sn—Y alloy (Y is an alkaline metal, an alkaline earth metal, group 13 to 16 elements, a transition metal, or a combination thereof, not Sn). The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ge, P, As, Sb, Bi, S, Se, Te, Po, or a combination thereof.

For example, the transition metal oxide may be lithium titanium oxide, vanadium oxide, lithium vanadium oxide, or the like.

For example, the non-transition metal oxide may be $SnO_2$, $SiO_x$ ($0<x<2$), or the like.

Specifically, the anode active material may include, but is not limited to, at least one selected from Si, Sn, Pb, Ge, Al, $SiO_x(0<x\leq2)$, $SnO_y(0<y\leq2)$, $Li_4Ti_5O_{12}$, $TiO_2$, $LiTiO_3$, and $Li_2Ti_3O_7$. Any anode active material may be used as long as it is a non-carbon anode active material used in the art.

Further, as the anode active material, a composite of the non-carbon anode active material and the carbon-based anode active material may be used, and the carbon-based anode active material may be additionally included in addition to the non-carbon anode active material.

The carbon-based anode active material may be crystalline carbon, amorphous carbon, or a mixture thereof. The crystalline carbon may be graphite such as natural graphite or artificial graphite of an amorphous, plate-like, flake-like, spherical or fibrous form. The amorphous carbon may be soft carbon (low-temperature fired carbon), hard carbon, mesophase pitch carbide, or fired coke. The above carbon-based anode active materials are merely examples and other carbon-based anode active materials are also possible.

As the conductive material, carbon black, graphite fine particles, natural graphite, artificial graphite, acetylene black, ketjen black, carbon fiber, carbon nanotubes, graphene; metal powder, metal fiber or metal tube of copper, nickel, aluminum, or silver; a conductive polymer such as polyphenylene derivatives; or a mixture thereof may be used. However, the present disclosure is not limited thereto, and any conductive material may be used as long as it is used in the art. In addition, the above-described crystalline carbon-based anode active material may be added as the conductive material.

As the binder, a vinylidene fluoride/hexafluoropropylene copolymer, polyvinylidene fluoride (PVDF), polyacrylonitrile, polymethyl methacrylate, polytetrafluoroethylene, a styrene-butadiene rubber-based polymer, or a mixture thereof may be used. However, the present disclosure is not limited thereto, and any binder may be used as long as it is used in the art.

As the solvent, N-methylpyrrolidone (NMP), acetone, or water may be used. However, the present disclosure is not limited thereto, and any solvent may be used as long as it is used in the art.

The content of the anode active material, the content of the conductive material, the content of the binder, and the content of the solvent are levels generally used in lithium batteries. At least one of the conductive material, the binder, and the solvent may be omitted depending on the use and configuration of the lithium battery.

Meanwhile, the binder used for preparing the anode may be the same as the binder in the coating composition included in the coating layer of the separator.

Next, a cathode active material composition in which a cathode active material, a conductive material, a binder, and a solvent are mixed is prepared. The cathode active material composition is directly applied onto a metal current collector to form a cathode plate. Alternatively, the cathode active material composition may be cast on a separate support, and then a film obtained by peeling from the support may be laminated on a metal current collector to form a cathode plate.

The cathode active material may include at least one selected from lithium cobalt oxide, lithium nickel cobalt manganese oxide, lithium nickel cobalt aluminum oxide, lithium iron phosphate, and lithium manganese oxide. However, the present disclosure is not limited thereto, and any cathode active material may be used as long as it may be used in the art.

For example, as cathode active material, a compound represented by any one of Formulae of $Li_aA_{1-b}B_bD_2$ (where, $0.90\leq a\leq1.8$, $0\leq b\leq0.5$); $Li_aE_{1-b}B_bO_{2-c}D_c$ (where, $0.90\leq a\leq1.8$, $0\leq b\leq0.5$, $0\leq c\leq0.05$); $LiE_{2-b}B_bO_{4-c}D_c$ (where, $0\leq b\leq0.5$, $0\leq c\leq0.05$); $Li_aNi_{1-b-c}Co_bB_cD_\alpha$ (where, $0.90\leq a\leq1.8$, $0\leq b\leq0.5$, $0\leq c\leq0.05$, $0<\alpha\leq2$); $Li_aNi_{1-b-c}Co_bB_cO_{2-\alpha}F_\alpha$ (where, $0.90\leq a\leq1.8$, $0\leq b\leq0.5$, $0\leq c\leq0.05$, $0<\alpha<2$); $Li_aNi_{1-b-c}Co_bB_cO_{2-\alpha}F_2$ (where, $0.90\leq a\leq1.8$, $0\leq b\leq0.5$, $0\leq c\leq0.05$, $<\alpha<2$); $Li_aNi_{1-b-c}Mn_bB_cD_\alpha$ (where, $0.90\leq a\leq1.8$, $0\leq b\leq0.5$, $0\leq c\leq0.05$, $0<\alpha\leq2$); $Li_aNi_{1-b-c}Mn_bB_cO_{2-\alpha}F_\alpha$ (where, $0.90\leq a\leq1.8$, $0\leq b\leq0.5$, $0\leq c\leq0.05$, $0<\alpha<2$); $Li_aNi_{1-b-c}Mn_bB_cO_{2-\alpha}F_2$ (where, $0.90\leq a\leq1.8$, $0\leq b\leq0.5$, $0\leq c\leq0.05$, $0<\alpha<2$); $Li_aNi_bE_cG_dO_2$ (where, $0.90\leq a\leq1.8$, $0\leq b\leq0.9$, $0\leq c\leq0.5$, $0.001\leq d\leq0.1$.); $Li_aNi_bE_cG_dO_2$ (where, $0.90\leq a\leq1.8$, $0\leq b\leq0.9$, $0\leq c\leq0.5$, $0.001\leq d\leq0.1$); $Li_aNiG_bO_2$ (where, $0.90\leq a\leq1.8$, $0.001\leq b\leq0.1$); $Li_aCoG_bO_2$ (where, $0.90\leq a\leq1.8$, $0.001\leq b\leq0.1$); $Li_aMnG_bO_2$ (where, $0.90\leq a\leq1.8$, $0.001\leq b\leq0.1$); $Li_aMn_2G_bO_4$ (where, $0.90\leq a\leq1.8$, $0.001\leq b\leq0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0\leq f\leq2$); $Li_{(3-f)}Fe_2(PO_4)_3$ ($0\leq f\leq2$); and $LiFePO_4$ may be used. The above cathode active materials are merely examples and other cathode active materials are also possible.

In Formulae above, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

In one or more embodiments, a compound having a coating layer on the surface of the compound may be used, or a mixture of the compound and a compound having a coating layer may be used. The coating layer may include a coating element compound of an oxide of a coating element, a hydroxide of a coating element, an oxyhydroxide of a coating element, an oxycarbonate of a coating element, or a hydroxycarbonate of a coating element. The compound constituting this coating layer may be amorphous or crystalline. As the coating element included in the coating layer, Mg, Al, Co, K, Na, Ca, Si, Ti, V, Sn, Ge, Ga, B, As, Zr, or a mixture thereof may be used. In the process of forming the coating layer, any coating method may be used as long as this compound may be coated with such elements by a method that does not adversely affect the physical properties of the cathode active material (for example, spray coating, dipping or the like). This coating method will be understood by those skilled in the art, so that a detailed description thereof will be omitted.

For example, as the cathode active material, $LiNiO_2$, $LiCoO_2$, $LiMn_xO_{2x}$ (x=1, 2), $LiNi_{1-x}Mn_xO_2$ (0<x<1), $LiNi_{1-x-y}Co_xMn_yO_2$ (0≤x≤0.5, 0≤y≤0.5), $LiFeO_2$, $V_2O_5$, TiS, or MoS may be used. The above cathode active materials are merely examples and other cathode active materials are also possible.

The conductive material, the binder, and the solvent in the cathode active material composition may be the same as those in the anode active material composition. Meanwhile, it is also possible to form pores inside the electrode plate by adding a plasticizer to the cathode active material composition and/or the anode active material composition.

The content of the cathode active material, the content of the conductive material, the content of a general binder, and the content of the solvent are levels generally used in lithium batteries. At least one of the conductive material, the general binder, and the solvent may be omitted depending on the use and configuration of the lithium battery.

Meanwhile, the binder used for preparing the cathode may be the same as the binder in the coating composition included in the coating layer of the separator.

Next, the composite separator described above is disposed between the cathode and the anode.

As described above, the separator disposed between the cathode and the anode in the electrode assembly including the cathode/separator/anode may include a porous substrate; and a coating layer disposed on both surfaces of the porous substrate, wherein the coating layer includes the above-described coating composition for a separator.

The separator may be separately prepared and then disposed between the anode and the cathode. Alternatively, the separator may be prepared through a formation process in which the electrode assembly including the cathode/separator/anode is wound in the form of a jelly roll, the jelly roll is accompanied in a battery case or a pouch, the jelly roll is thermally softened under pressure in the state of being accompanied in the battery case or the pouch and is pre-charged, and the pre-charged jelly roll is hot-rolled, cold-rolled, and charged and discharged under pressure.

Next, an electrolyte is prepared.

The electrolyte may be in a liquid or gel state.

For example, the electrolyte may be an organic electrolyte. Further, the electrolyte may be a solid electrolyte. For example, the solid electrolyte may be boron oxide, lithium oxynitride, or the like, but is not limited thereto. Any solid electrolyte may be used as long as it may be used in the art. The solid electrolyte may be formed on the anode by a method such as sputtering.

For example, an organic electrolyte solution may be prepared. The organic electrolyte solution may be prepared by dissolving a lithium salt in an organic solvent.

As the organic solvent, any organic solvent may be used as long as it may be used in the art. For example, the organic solvent may be propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, or a mixture thereof.

As the lithium salt, any lithium salt may be used as long as it may be used in the art. For example, the lithium salt may be $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (x and y are each a natural number), LiCl, LiI, or a mixture thereof. The above lithium salts are merely examples, and other lithium salts are also possible.

Figure 8:
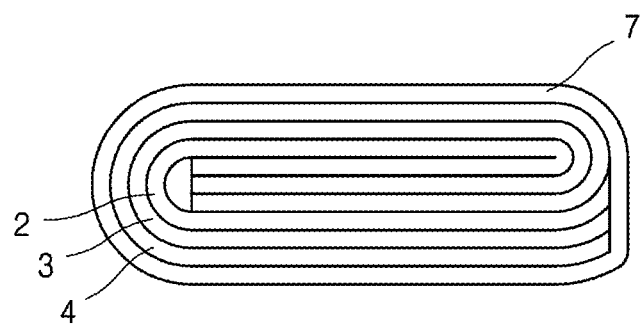
FIG. 8 is an exemplary schematic view of a lithium battery including an electrode assembly wound in a flat jelly roll shape according to an embodiment.

As shown in FIG. 8, a lithium battery includes a cathode 3, an anode 2, and a composite separator 4. The cathode 3, the anode 2, and the separator 4 are wound into an electrode assembly having a flat jelly roll shape and then accommodated in a pouch 7. Subsequently, an organic electrolyte is injected into the pouch 7, and the pouch 7 is sealed to complete the lithium battery.

Figure 9:
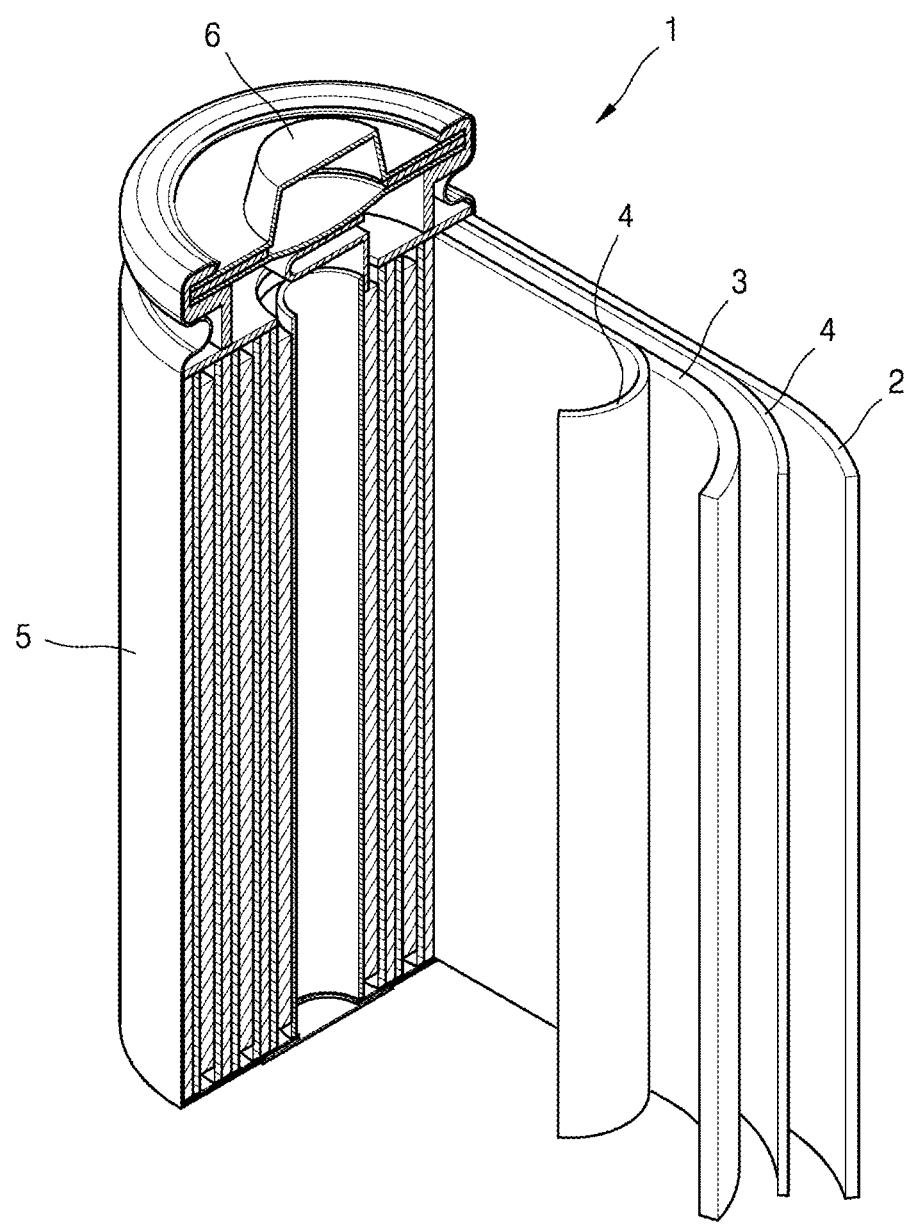
FIG. 9 is an exemplary schematic view of a lithium battery including an electrode assembly wound in a cylindrical jelly roll shape according to an embodiment.

As shown in FIG. 9, the lithium battery 1 includes a cathode 3, an anode 2, and a separator 4 between the cathode 3 and the anode 2. The cathode 3, the anode 2, and the separator 4 are wound into an electrode assembly having a cylindrical jelly roll shape and then accommodated in a battery case 5. Subsequently, an organic electrolyte is injected into the battery case 5, and the battery case 5 is sealed with a cap assembly 6 to complete the lithium battery 1. The battery case 5 may have a cylindrical shape, a rectangular shape, or a thin film shape. The lithium battery 1 may be a lithium ion battery. The lithium battery 1 may be a lithium polymer battery.

The lithium battery 1 is suitable for electric vehicles (EV) because it has excellent high rate characteristics and lifespan characteristics. For example, the lithium battery 1 is suitable for hybrid vehicles such as plug-in hybrid electric vehicles (PHEV).

Hereinafter, the present inventive concept will be described in more detail through Examples and Comparative Examples. However, these Examples are set forth to illustrate the present inventive concept, and the scope of the present inventive step is not limited thereto.

(Preparation of Separator)

Preparation Example 1

As organic particles, polyethylene wax (PE wax) having an average particle diameter (D50) of 0.2 μm was used. As a binder, poly(acrylic acid-co-acrylamide-co-2-acrylamido-2-methylpropanesulfonic acid) sodium salt was prepared as a copolymer according to the method disclosed in Korean Patent Application No. 10-2018-0111702, and used. Here, the molar ratio of acrylic acid, acrylamide, and 2-acrylamido-2-methylpropanesulfonic acid is 20:75:5. The melting point (Tm) of the copolymer is 170° C. As inorganic particles, alumina (AES-11, manufactured by Sumitomo Chemical Co., Ltd.) having an average particle diameter (D50) of 0.4 □m to 0.6 □m was used.

Assuming that all PE wax melts at 150° C., when the ratio of organic particles in the organic particles in the coating layer and the inorganic particles representing the true density of the coating layer is considered as porosity, 67.2 parts by weight of the organic particles, 4 parts by weight of the binder, and 28.8 parts by weight of the inorganic particles were mixed such that the porosity of the coating layer was 70% to prepare a slurry for forming a coating layer. Here, 20 wt % of the slurry was prepared using DI Water as a solvent. The composition for forming a coating layer was gravure-printed on both sides of a polyethylene porous substrate (PE, manufactured by SK Innovation Corporation) having a thickness of 7 □m to form a coating layer having a thickness of 3.0 □m on both sides of the porous substrate.

Subsequently, a slurry for forming an electrode adhesive layer containing poly(2-ethylhexylacrylate) as an organic binder, polyvinylidene fluoride, and water as a solvent was gravure-printed on the coating layer to form an electrode adhesive layer having a thickness of 2 □m, so as to prepare a separator. The separator has a thickness of 12 □m.

Comparative Preparation Example 1

The polyethylene porous substrate (PE, manufactured by SK Innovation Corporation) itself having a thickness of 7 μm was used as a separator of Comparative Preparation Example 1.

Comparative Preparation Example 2

A separator was prepared in the same manner as in Preparation Example 1, except that the binder in Preparation Example 1 was not used, and as organic particles, a slurry for forming a coating layer containing polyethylene (PE) having an average particle diameter (D50) of 0.2 □m was prepared and used.

Comparative Preparation Example 3

A separator was prepared in the same manner as in Preparation Example 1, except that 28.8 parts by weight of the organic particles, 4 parts by weight of the binder, and 67.2 parts by weight of the inorganic particles were mixed such that the porosity of the coating layer was 30% to prepare a slurry for forming a coating layer.

Comparative Preparation Example 4

A separator was prepared in the same manner as in Preparation Example 1, except that 48 parts by weight of the organic particles, 4 parts by weight of the binder, and 48 parts by weight of the inorganic particles were mixed such that the porosity of the coating layer was 50% to prepare a slurry for forming a coating layer.

Comparative Preparation Example 5

A separator was prepared in the same manner as in Preparation Example 1, except that an acrylate-based polymerization binder (BM-2550M, manufactured by Xeon Corporation) was used as low-melting binder instead of the binder in Preparation Example 1. The low-melting binder has a melting point (Tm) of 80□C.

(Manufacture of Lithium Battery)

Example 1

(Preparation of Anode)

97 wt % of graphite particles (C1SR, manufactured by Nippon Carbon Corporation) having an average particle size of 25 □m, 1.5 wt % of a styrene-butadiene rubber (SBR) binder (manufactured by Zeon Corporation), and 1.5 wt % of carboxymethyl cellulose (CMC) (manufactured by NIPPON A&L) were mixed, introduced into distilled water, and stirred for 60 minutes using a mechanical stirrer to prepare an anode active material slurry. The slurry was applied onto a copper current collector having a thickness of 10 □m using a doctor blade, dried at 100□C for 0.5 hours using a hot air dryer, further dried in vacuum at 120□C for 4 hours, and then roll-pressed to prepare an anode plate.

(Preparation of Cathode)

97 wt % of $LiCoO_2$, 1.5 wt % of carbon black powder as a conductive material, and 1.5 wt % of Polyvinylidene fluoride (PVdF, SOLVAY) were mixed, introduced into N-methyl-2-pyrrolidone as a solvent, and stirred for 30 minutes using a mechanical stirrer to prepare a cathode active material slurry. The slurry was applied onto an aluminum current collector having a thickness of 20 □m using a doctor blade, dried at 100□C for 0.5 hours using a hot air dryer, further dried in vacuum at 120□C for 4 hours, and then roll-pressed to prepare a cathode plate.

(Electrode Assembly Jelly Roll)

The separator prepared in Preparation Example 1 was interposed between the above-prepared cathode plate and the above-prepared anode plate, and then wound to prepare an electrode assembly jelly roll. The jelly roll was inserted into a pouch, an electrolyte was injected, and then the pouch was vacuum-sealed.

As the electrolyte, an electrolyte in which $LiPF_6$ is dissolved in a mixed solvent of ethylene carbonate (EC)/ethyl methyl carbonate (EMC)/diethyl carbonate (DEC) of volume ratio of 3/5/2 was used.

The jelly roll inserted into the pouch was pre-charged up to 50% of SOC while thermally softening the jelly roll at a temperature of 70□C for 1 hour under a pressure of 250 $kgf/cm^2$.

The jelly roll was hot-pressed at a temperature of 85□C for 180 seconds under a pressure of 200 $kgf/cm^2$. During the hot rolling process, as the binder transitions from a gel state to a sol state, adhesive force is generated between the anode/cathode and the separator.

Subsequently, the jelly roll was cold-pressed at a temperature of 22□C to 85□C for 90 seconds under a pressure of 200 $kgf/cm^2$. During the cold rolling process, the binder transitioned from a sol state to a gel state.

Subsequently, gas was removed from the pouch, the jelly roll was charged with a constant current of 0.2 C rate at a temperature of 45□C for 1 hour under a pressure of 200 $kgf/cm^2$ until a voltage reached 4.3 V, and was charged with a constant voltage while maintaining the voltage at 4.3 V until the current reached 0.05 C. Subsequently, the cycle of discharging the jelly roll with a constant current of 0.2 C was repeated 5 times until the voltage reached 3.0V during discharging to perform the formation step.

Comparative Examples 1 to 4

Lithium batteries were manufactured in the same manner as in Example 1, except that the separators prepared in Comparative Preparation Examples 1 to 4 were used, respectively.

Evaluation Example 1: Measurement of Penetration Characteristics

The jelly roll was taken out of each of the pouches of Example 1 and Comparative Examples 1 to 4 that had undergone the formation step, and the separator was separated from the jelly roll, and penetration characteristics of the separator were evaluated. Results thereof are shown in Table 1 below. The degree and probability of occurrence of abnormality were evaluated according to a phenomenon observed after performing a nail test on each separator. In the case of L4-3 and L6, it was evaluated that abnormality occurred.

TABLE 1

|  | L3 (no abnormality) | L4-1 (smoke occurs after bending) | L4-3 (spark (2 second or more)) | L6 (Destruction) | Sum | Probability of no abnormality (%) |
| --- | --- | --- | --- | --- | --- | --- |
| Comparative Example 1 | — | — | — | 9 | 9 | 0% |
| Comparative Example 2 | 4 | — | 3 | 1 | 8 | 50% |
| Comparative Example 3 | — | 1 | 5 | 4 | 10 | 13% |
| Comparative Example 4 | 1 | 3 | 3 | 3 | 10 | 40% |
| Example 1 | 2 | 5 | 3 | — | 10 | 70% |

As shown in Table 1, penetration characteristics of the composite separator of Example 1 were significantly improved compared to those of the separators of Comparative Examples 1 to 4.

Evaluation Example 2: Scanning Electron Microscope (SEM) Observation

Figure 3:
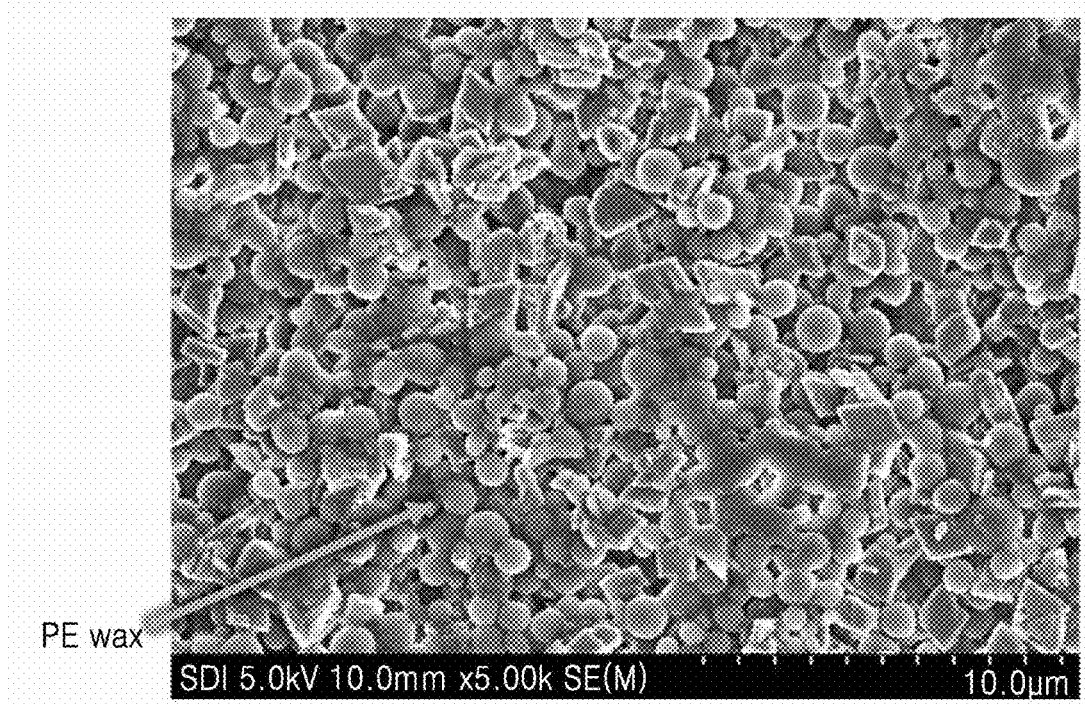
FIG. 3 is an exemplary scanning electron microscope (SEM) photograph illustrating a state of a coating layer of the separator prepared in Preparation Example 1 before exposure to high temperature.
Figure 4:
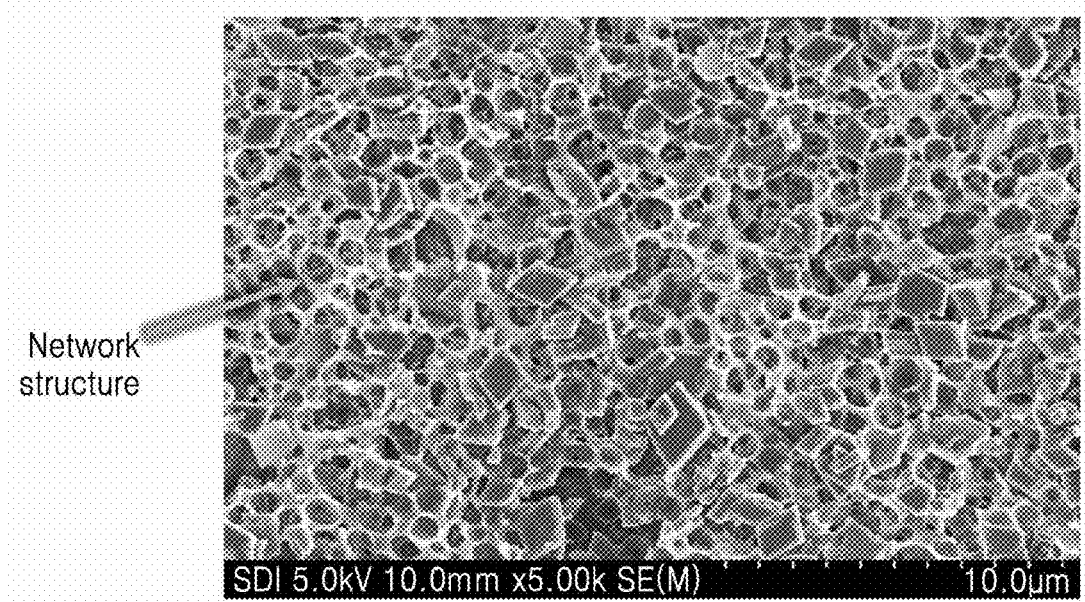
FIG. 4 is an exemplary SEM photograph illustrating a state of a coating layer of the separator prepared in Preparation Example 1 after exposure to high temperature.
Figure 5:
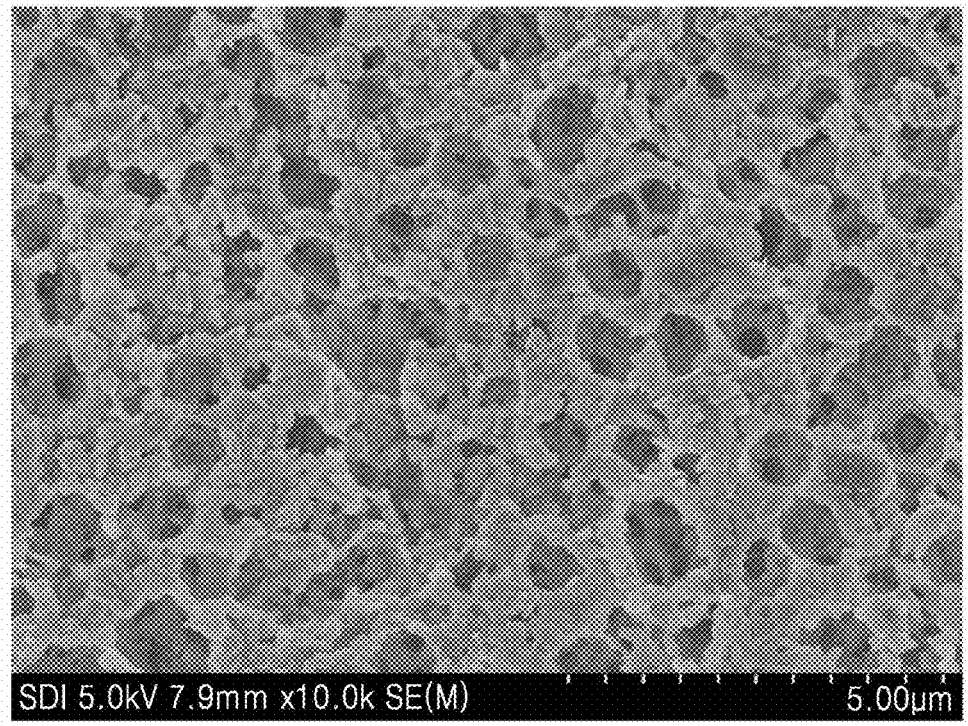
FIG. 5 is an exemplary SEM photograph illustrating an enlarged network structure of a coating layer of the separator prepared in Preparation Example 1 after exposure to high temperature.

In order to check whether the separator prepared in Preparation Example 1 has a network structure when exposed to high temperature, the separator was left at a high temperature of 120° C. for 1 hour and then observed with a scanning electron microscope (SEM). The SEM observation results of the separator before and after leaving the separator at high temperature are shown in FIGS. 3 and 4, respectively. FIG. 5 is an enlarged view of FIG. 4.

As shown in FIG. 3, it may be found that a coating layer (that is, a shutdown layer) including organic particles and inorganic particles is formed on the separator prepared in Preparation Example 1.

As shown in FIGS. 4 and 5, it may be found that after leaving the separator prepared in Preparation Example 1 at a high temperature, the organic particles of the coating layer are dissolved, and the shapes of the shutdown particles are maintained, thereby maintaining the matrix of a network structure (arrow). Thermal stability will improve as the coating layer maintains the network structure. In addition, the separator will also increase the air permeability rapidly by maintaining the network structure of the coating layer.

Figure 6:
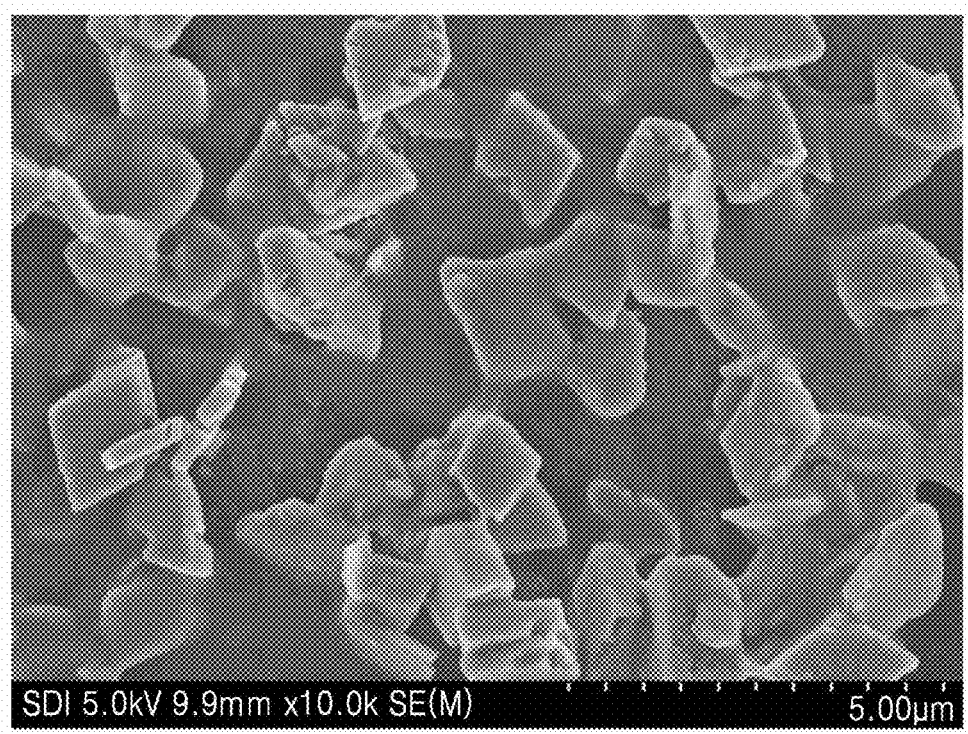
FIG. 6 is an exemplary SEM photograph illustrating a state of a coating layer of the separator prepared in Comparative Preparation Example 5 after exposure to high temperature.

FIG. 6 is an SEM image of the separator prepared in Comparative Preparation Example 5 after being left at high temperature under the same conditions.

As shown in FIG. 6, it may be found that, in the separator prepared in Comparative Preparation Example 5, not only the PE particles but also the low melting point binder melt after being left at high temperature, and thus the coating layer cannot be maintained.

The separator according to one aspect may maintain the coating layer of a network structure even at high temperatures, and thus, when a shutdown occurs, a rapid increase in temperature and heat generation is delayed, thereby improving high-temperature stability of a lithium battery.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A separator for a lithium battery, the separator comprising:
   a porous substrate; and
   a coating layer disposed on a surface of the porous substrate, the coating layer comprising organic particles, a binder, and inorganic particles, the organic particles having a melting point of 100° C. to 130° C., the binder having a melting point higher than the melting point of the organic particles by 30° C. or more,
   wherein the organic particles are coated by the binder,
   wherein the organic particles comprise at least one selected from the group consisting of polyethylene, polypropylene, polystyrene, polyvinylidene fluoride, polymethyl methacrylate, an acrylate compound, polyacrylonitrile, an azodicarbonamide compound, derivatives thereof, and copolymers thereof,
   wherein the binder comprises at least one selected from the group consisting of a sulfonate compound and a derivative thereof, an acrylamide compound and a derivative thereof, an acrylonitrile compound and a derivative thereof, an acrylic acid and a derivative thereof, copolymers thereof, and mixtures thereof,
   wherein a content of the organic particles is more than 50 wt % based on a total weight of the organic particles and the inorganic particles, wherein the inorganic particles comprise at least one selected from the group consisting of alumina, boehmite, $BaSO_4$, MgO, $Mg(OH)_2$, clay, silica, and $TiO_2$, wherein a content of the binder is in a range of 1 wt % to 15 wt % based on a total weight of the organic particles and the binder, and wherein the binder has a matrix form of a network structure.

2. The separator of claim 1, wherein the melting point of the binder is 160° C.

3. The separator of claim 1, wherein the melting point of the binder is 160° C. to 180° C.

4. The separator of claim 1, wherein the organic particles are embedded in the binder.

5. The separator of claim 1, wherein a weight ratio of the organic particles and the inorganic particles is 51:49 to 90:10.

6. The separator of claim 1, wherein the coating layer has a thickness of 0.1 μm to 5.0 μm.

7. The separator of claim 1, further comprising: an electrode adhesive layer on the coating layer.

8. The separator of claim 7, wherein the electrode adhesive layer has a thickness of 0.1 μm to 5.0 μm.

9. A lithium battery comprising:
an electrode assembly comprising:
a cathode;
an anode; and
a separator interposed between the cathode and the anode, the separator comprising:
a porous substrate; and
a coating layer disposed on a surface of the porous substrate, the coating layer comprising organic particles, a binder and inorganic particles, the organic particles having a melting point of 100° C. to 130° C., the binder having a melting point higher than the melting point of the organic particles by 30° C. or more,
wherein the organic particles comprise at least one selected from the group consisting of polyethylene, polypropylene, polystyrene, polyvinylidene fluoride, polymethyl methacrylate, an acrylate compound, polyacrylonitrile, an azodicarbonamide compound, derivatives thereof, and copolymers thereof,
wherein the binder comprises at least one selected from the group consisting of a sulfonate compound and a derivative thereof, an acrylamide compound and a derivative thereof, an acrylonitrile compound and a derivative thereof, an acrylic acid and a derivative thereof, copolymers thereof, and mixtures thereof,
wherein a content of the organic particles is more than 50 wt % based on a total weight of the organic particles and the inorganic particles,
wherein the inorganic particles comprise at least one selected from the group consisting of alumina, boehmite, $BaSO_4$, MgO, $Mg(OH)_2$, clay, silica, and $TiO_2$,
wherein a content of the binder is in a range of 1 wt % to 15 wt % based on a total weight of the organic particles and the binder, and
wherein the binder has a matrix form of a network structure.

10. The lithium battery of claim 9, wherein the electrode assembly is wound in a jelly roll shape.

11. A separator for a lithium battery, the separator comprising:
a porous substrate; and
a coating layer disposed on a surface of the porous substrate, the coating layer comprising organic particles, a binder and inorganic particles, the organic particles having a melting point, the binder having a melting point higher than the melting point of the organic particles, wherein the organic particles are coated with or embedded in the binder,
wherein the organic particles comprise at least one selected from the group consisting of polyethylene, polypropylene, polystyrene, polyvinylidene fluoride, polymethyl methacrylate, an acrylate compound, polyacrylonitrile, an azodicarbonamide compound, derivatives thereof, and copolymers thereof,
wherein the binder comprises at least one selected from the group consisting of a sulfonate compound and a derivative thereof, an acrylamide compound and a derivative thereof, an acrylonitrile compound and a derivative thereof, an acrylic acid and a derivative thereof, copolymers thereof, and mixtures thereof,
wherein a content of the organic particles is more than 50 wt % based on a total weight of the organic particles and the inorganic particles,
wherein the inorganic particles comprise at least one selected from the group consisting of alumina, boehmite, $BaSO_4$, MgO, $Mg(OH)_2$, clay, silica, and $TiO_2$,
wherein a content of the binder is in a range of 1 wt % to 15 wt % based on a total weight of the organic particles and the binder, and
wherein the binder has a matrix form of a network structure.

12. The separator of claim 11, wherein the melting point of the binder is higher than the melting point of the organic particles by 30° C.

13. The separator of claim 12, wherein the melting point of the organic particles is 100° C. to 130° C. and the melting point of the binder is 160° C. to 180° C.

* * * * *

UNITED STATES PATENT AND TRADEMARK OFFICE
CERTIFICATE OF CORRECTION

Page 1 of 1

PATENT NO. : 12,438,235 B2
APPLICATION NO. : 17/226999
DATED : October 7, 2025
INVENTOR(S) : Jungyoon Lee It is certified that error appears in the above-identified patent and that said Letters Patent is hereby corrected as shown below:

On the Title Page

Column 1, Page 2, item [56], Line 34, delete "Sakural et al." and insert -- Sakurai et al. --.

Column 2, Page 2, item [56], Line 2, delete "Properties Other Info," and insert -- Properties & Other Info, --.

Column 2, Page 2, item [56], Line 7, delete "Properties, Uses Application," and insert -- Properties, Uses & Application, --.

Signed and Sealed this
Third Day of February, 2026

John A. Squires
*Director of the United States Patent and Trademark Office*